INVENTOR
DEWEY E. WORNOM

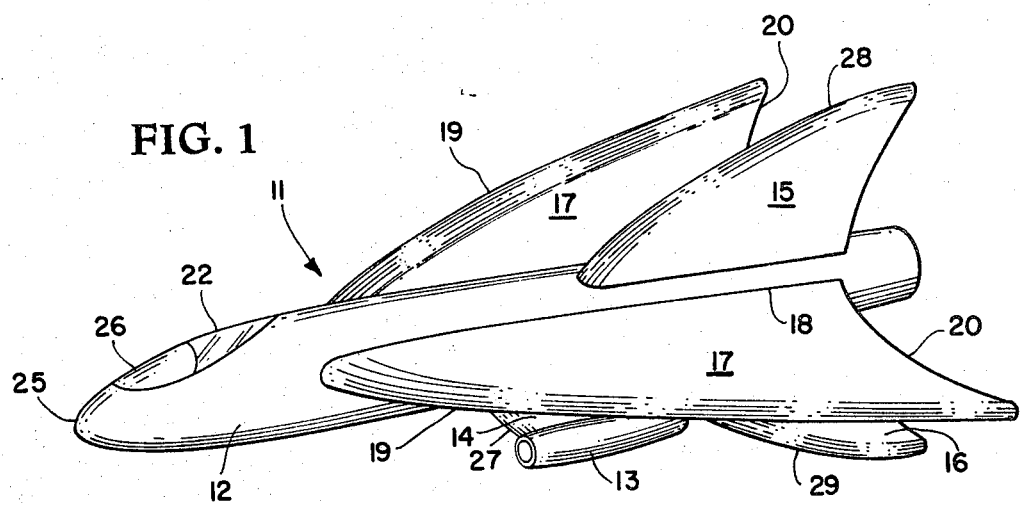
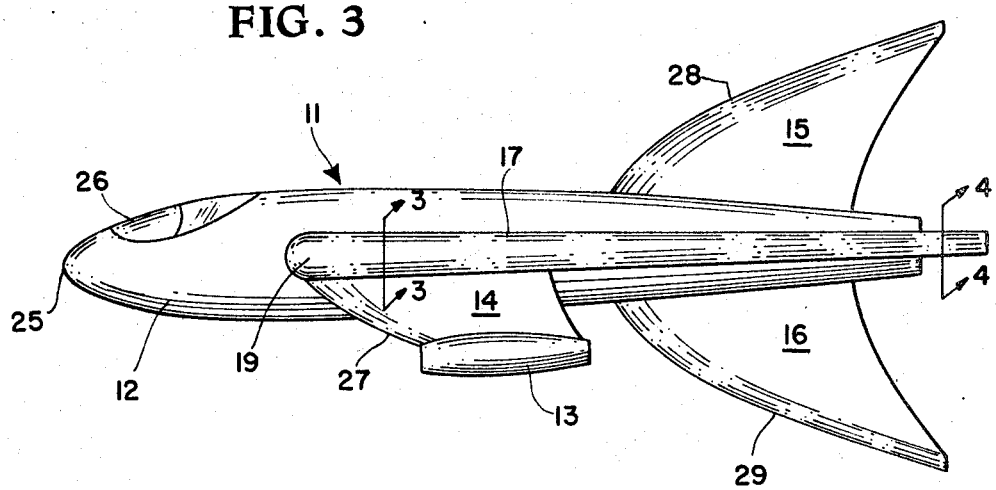

BY

ATTORNEYS

United States Patent Office 3,392,936
Patented July 16, 1968

3,392,936
LEADING EDGE CURVATURE BASED ON
CONVECTIVE HEATING
Dewey E. Wornom, Hampton, Va., assignor to the United
States of America as represented by the Administrator
of the National Aeronautics and Space Administration
Filed Sept. 1, 1965, Ser. No. 484,485
4 Claims. (Cl. 244—13)

ABSTRACT OF THE DISCLOSURE

A high speed flight vehicle having improved flight efficiently at both subsonic and high speeds wherein all leading edges of the vehicle are provided with leading edge curvature while the leading edge sweep is maintained, along with a corresponding decreasing leading edge radius, such that the relationship between sweep and radius that is normally associated with aerodynamic heating at high speeds is not altered.

---

The invention described and claimed herein may be manufactured and used by or for the Government of the United States of America without the payment of any royalties thereon or therefor.

This invention relates generally to aerial vehicles and relates with particularity to the construction of leading edges of surfaces for such vehicles including an analytical method of introducing curvature to a blunt leading edge while maintaining a constant leading edge geometric relationship involved in laminar convective heating rate.

For maximum aerodynamic efficiency and stability present day design criteria for straight leading edges of lifting, nonlifting or structural surfaces of flight vehicles, required to perform from takeoff to above transonic speeds, is not compatible for all speed ranges. At subsonic speeds a moderately swept surface with large rounded leading edges is needed whereas at, and above, transonic speeds highly swept small rounded or sharp leading edges are necessary. At high speed flight where aerodynamic heating must be considered, the design problem is further complicated by the necessity of either blunting the leading edges, which is detrimental to efficient high speed flight, and/or increasing leading edge sweep, which is detrimental to efficient and stable low speed flight.

Therefore, the present practice in the final leading edge design of flight vehicles has been to seek an optimum choice between those required for different flight speed ranges which therefore have less than optimum aerodynamic characteristics throughout the complete flight speed range.

It is, therefore, an object of the present invention to provide a flight vehicle having spanwise planform curvature along the leading edges thereof which, due to the increasing spanwise sweep, will permit a corresponding decrease in radius along the outboard region without change in the aerodynamic heating characteristics of the leading edge.

Another object of the present invention is an analytical method of introducing curvature to a blunt leading edge while maintaining a constant leading edge geometric relationship involved in laminar convective heating rate.

A further object of the present invention is a method of improving the flight efficiency of flight vehicles, required to perform from subsonic to above transonic speeds, by providing leading edge curvature to all leading edges of the vehicle.

Yet another object of the present invention is a new and novel flight vehicle configuration having lift-drag ratios up to 32 percent greater, together with improved landing speed characteristics than a vehicle having straight, blunt, highly swept leading edges.

According to the present invention, the foregoing and other objects are attained by providing in a high speed flight vehicle structurally improved, more efficient, leading edges. This is accomplished by introducing spanwise planform curvature to the normal straight leading edges of flight vehicular components, which, due to the increasing spanwise sweep, will permit spanwise decreasing leading edge radius without changing the aerodynamic heating characteristics of the leading edge. This requires that the ratio of the trigonometric cosine of the effective sweep to the square root of the leading edge radius, at any point along the curved leading edge, be equal to that of the normal straight leading edge. This is a well known aerodynamic principle. Since a straight leading edge generally has a constant leading edge sweep and radius, its ratio will also be constant. Thus, the ratio for the curved leading edge must also be this same constant value at any point along its span.

A more complete appreciation of the invention and many of the attendant advantages thereof will be readily apparent as the same becomes better understood by reference to the following detailed description when considered in connection with the accompanying drawings wherein:

FIG. 1 is a view of an exemplary flight vehicle illustrating the various points thereon provided with curvature according to the present invention;

FIG. 2 is another view of the flight vehicle as shown in FIG. 1;

FIG. 3 is a sectional view taken along lines 3—3 of FIG. 2;

FIG. 4 is a sectional view taken along lines 4—4 of FIG. 2;

Figure 6:
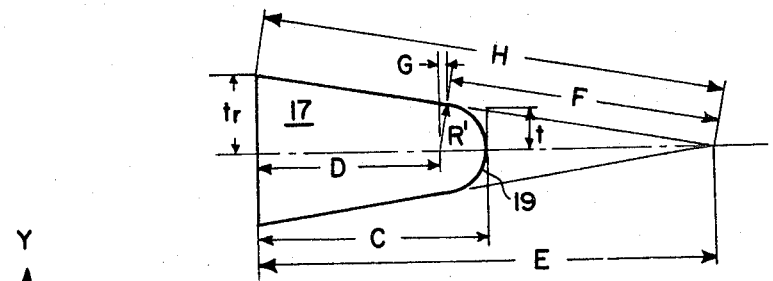
FIG. 6 is a section taken along lines 6—6 of FIG. 5 also illustrating the geometric relations for determining the leading edge curvature and radius of a flight vehicle component.

Referring now more particularly to the drawings wherein like reference numerals designate identical parts throughout the several views, and more explicitly to FIGS. 1–4, there is shown an exemplary swept wing flight vehicle, generally designated by the reference numeral 11, embodying the improvements in aerodynamic efficiency of the present invention. Flight vehicle 11 is provided with a fuselage 12 which may be of the type having a reaction propulsion motor mounted therein, and which is proportional to have a length to the equivalent diameter, or fineness ratio, suitable for flight at speeds greater than subsonic. Flight vehicle 11 is also provided with a pair of auxiliary propulsion engine nacelles, one of which is shown in the figures and designated by reference numeral 13, and attached to vehicle 11 by pylons 14. An empennage assembly, including vertical stabilizer members 15 and 16 project, respectively, upwardly and downwardly from the surface of fuselage 12, adjacent the after end of the fuselage. The airfoil sections of these stabilizer members 14 and 15 are preferably taken from the family of symmetrically thin airfoils based on the speed range in which the vehicle must operate.

Flight vehicle 11 is also provided with a wing projecting outwardly from each side of fuselage 12, as designated by reference numeral 17. Each wing 17 includes a root section 18, a curved leading edge 19, and a curved trailing edge 20.

A suitable control compartment or pilots cabin 22 is also included in fuselage 12 adjacent the forward end thereof.

Leading edge 19 of wing 17, as well as the leading edges 26 on compartment 22; 27 on pylon 14; 28 on stabilizer 15; and 29 on stabilizer 16, are each provided with planform leading edge curvature with spanwise decreasing leading edge radius, as more fully explained hereinafter.

The showing of control surfaces and the like on wing 17 and the landing gear arrangements for vehicle 11 have been omitted in the interest of clarity, although it is to be understood that they are required in the actual practice of the invention. In this respect, vertical stabilizer 16 may be jettisonable for landing as is well known in the X-15 type aircraft.

Figure 5:
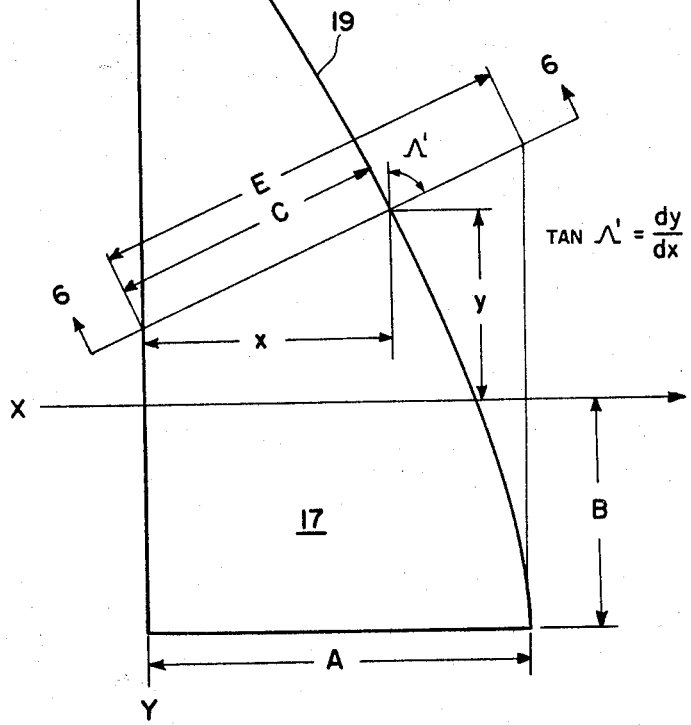
FIG. 5 is a view, illustrated by rectangular coordinates, of a flight vehicle component constructed in accordance with the present invention.

Referring now more particularly to FIGS. 5 and 6, the geometric relations for determining the leading edge curvature and radius of wing 17, vertical stabilizers 15 and 16, pylon 14, and leading edge 26 are shown. In FIG. 5, using wing 17 as an example, the geometry for leading edge curvature and radius is illustrated along rectangular coordinates X—X and Y—Y. Reference letters A, B, C, D, E, F, G, and H represent distance measurements as shown in FIG. 5. The local leading edge radius of curved leading edge 19 on wing 17 is designated by R', the local half thickness at the leading edge surface is designated by reference letter $t$, and the half thickness at root section 18 of wing 17 is designated by reference letter $t_r$. The Cartesian coordinates of curved leading edge 19 are designated by reference letters $x$ and $y$ while the local effective sweep angle of curved leading edge 19 or the angle between the freestream direction and the leading edge.

The leading edge geometry for the leading edge surface 19 of wing 17, as shown on the vehicle of FIG. 1, was developed by applying the known analytical method to a straight leading-edge wing, and as more fully described hereinafter. First, the values of the constants A and B (FIG. 5), which serve to position the curve for the leading edge on the rectangular coordinates, are determined using assumed wing-tip boundary conditions for the curved leading edge wing. The constant A is computed from the following equation:

$$\tan \Lambda' = -\frac{\sqrt{dy}}{\sqrt{dx}} \cdot \frac{1 - \cos^2 \Lambda_e \left(1 - \frac{x}{A}\right)}{\cos^2 \alpha - 1 + \cos^2 \Lambda_e \left(1 - \frac{x}{A}\right)}$$

where $$\cos^2 \Lambda_e = 1 - (\cos \alpha \sin \Lambda)^2$$

The assumed wing-tip boundary conditions for the curved leading edge wing are $x$ and $\Lambda'$, $x$ being the desired semispan of the wing and $\Lambda'$ being the desired local leading edge sweep at the wing tip. The value for $\alpha$ is the angle of attack at which the vehicle of FIG. 1 is designed to operate and the value for $\Lambda$ is the leading edge sweep angle of the straight leading edge wing that the curved leading edge is designed to replace.

The constant B is computed from the following equation and as more fully explained hereinafter.

$$y = \sqrt{\frac{A}{\cos^2 \Lambda_e} - A + x} \sqrt{\frac{A \cos^2 \alpha}{\cos^2 \Lambda_e} - \frac{A}{\cos^2 \Lambda_e} + A - x}$$

$$+ \frac{A \cos^2 \alpha}{\cos^2 \Lambda_e} \sin^{-1} \frac{\sqrt{\frac{A \cos^2 \alpha}{\cos^2 \Lambda_e} - \frac{A}{\cos^2 \Lambda_e} + A - x}}{\sqrt{\frac{A \cos^2 \alpha}{\cos^2 \Lambda_e}}} + B$$

The wing tip boundary conditions used for $y$ is zero. The values for $\Lambda_e$, $\alpha$, and $x$ are those used in determining the constant A, as explained hereinabove, and the value of the constant A in this equation is the value previously determined as also explained hereinbefore.

Thus, with the constants A and B determined, and the remaining terms in the expressions for $\Lambda'$ and $y$ defined hereinbefore, with the exception of $x$, the values for $\Lambda'$ and $y$ are computed for corresponding assumed values of $x$ ranging from zero to that of the wing tip.

To complete the geometric description of the curved leading edge, its local radii, $R^1$, is computed from the equation:

$$R' = \frac{x - A}{\sin \Lambda' - \frac{A^2}{t_r \sqrt{t_r^2 \sin^2 \Lambda + A^2}} - \frac{t_r \sin \Lambda'}{\sqrt{t_r^2 + \frac{A^2}{\sin^2 \Lambda'}}}}$$

The value of the constant A and the associated variable $x$ and $\Lambda'$ are the same as those used before. The value of $t_r$ is the desired wing root half-thickness.

Computed values of $\Lambda'$, $y$ and $R^1$ for selected values of $x$ used to design an exemplary experimental wind tunnel model for testing in the Langley Research Center two-foot hypersonic facility are set forth in Table I below:

TABLE I

| $x$ (in.) | $\Lambda'$ (deg.) | $y$ (in.) | $R^1$ (in.) |
|---|---|---|---|
| 0 | 70.00 | 14.12 | 0.31 |
| .30 | 70.56 | 13.29 | .30 |
| .60 | 71.13 | 12.43 | .29 |
| .90 | 71.73 | 11.53 | .28 |
| 1.20 | 72.34 | 10.61 | .26 |
| 1.50 | 72.96 | 9.65 | .25 |
| 1.80 | 73.61 | 8.65 | .24 |
| 2.10 | 74.23 | 7.60 | .23 |
| 2.40 | 74.88 | 6.52 | .22 |
| 2.70 | 75.72 | 5.36 | .20 |
| 3.00 | 76.48 | 4.15 | .19 |
| 3.30 | 77.29 | 2.87 | .18 |
| 3.60 | 78.15 | 1.49 | .17 |
| 3.90 | 79.06 | 0 | .16 |

The values are based on a desired wing semispan of $x=3.90$ inches, a desired local wing tip leading edge sweep of $\Lambda'=79.06$ degrees, a vehicle operating angle of attack of $\alpha=12$ degrees, a sweep angle of $\Lambda=70$ degrees on the straight leading edge wing that the curved leading edge is desired to replace and a desired wing root half-thickness of $t_r=0.3$ inch.

*Tests, measurements and accuracy*

For testing, the curved leading edge wing model described above and the straight leading edge wing that it was designed to replace were mounted in the tunnel test section of the two-foot hypersonic facility at Langley Research Center on a 0.75-inch diameter sting and a conventional sting support arrangement.

The wings were tested at angles of attack from $-5°$ to approximately 13°. Other test conditions were as follows:

TABLE II

| Mach Number | Tunnel Stagnation Pressure, lb./sq. ft. | Stagnation Temp., ° F | Approximate Reynolds Number per foot |
|---|---|---|---|
| 3.0 | 2,115 | 95 | $2.26 \times 10^6$ |
| 6.0 | 5,570 | 315 | $.91 \times 10^6$ |

Forces and moments were measured by an electrical strain-gage balance located inside the balance chamber of each wing. The pressures in the balance chamber and along the wing trailing edge were also measured.

The angle-of-attack measurements were corrected for balance and sting deflection under load. The values of angle of attack are estimated to be accurate within $\pm 0.2°$.

Based on the sensitivity of the strain-gage balance, the measured coefficients are accurate within the following limits: lift coefficient $(C_L) = \pm 0.005$; drag coefficient $(C_D) = \pm 0.001$; pitching moment coefficient $$(C_M) = \pm 0.001$$

The results of the force data presented herein were not adjusted to freestream conditions at the base of the wings or balance chamber housing. The estimated accuracy of balance-chamber drag coefficient ($C_{D,c}$) and trailing edge drag coefficient ($C_{D,te}$) is ±10 percent of the measured values.

Comparison of the lift and pitching moment coefficients for the exemplary wing of the present invention with a straight leading edge wing that it was designed to replace and a curved leading edge wing with constant leading edge radius showed no appreciable effects on these longitudinal aerodynamic characteristics due to either leading edge curvature or decreasing spanwise leading edge radius. The most pronounced effects observed due to leading edge curvature and decreasing spanwise leading edge radius were on the drag characteristics. At Mach 3, a twenty-six percent reduction in zero lift drag due to combined leading edge curvature and decreasing spanwise leading edge radius was obtained, the largest part of the reduction, seventeen percent, being due to leading edge curvature alone. At Mach 6, a greater zero lift drag reduction of fifty percent was noted, the largest part of the reduction, twenty-nine percent, resulting from decreasing spanwise leading edge radius. These zero-lift drag reductions, which were maintained at lifting conditions, were reflected as increases in lift-drag ratios. These combined leading edge modifications resulted in a sixteen and thirty-two percent increase in maximum lift-drag ratio at respective Mach numbers of 3 and 6 with a slight decrease in lift coefficient for maximum lift-drag ratio.

Results of force tests of three wings, one with a straight leading edge and two with curved leading edges, at Mach numbers of 3 and 6 are discussed more fully in NASA Technical Note TN D-2486. Briefly, these results showed the following characteristics:

(a) The lift and pitching moment characteristics of both curved leading-edge wings were essentially identical to those of the straight leading-edge wing.

(b) Zero-lift drag coefficients of the curved leading-edge wing with spanwise decreasing leading-edge radius and corresponding wing thickness were twenty-six and fifty percent lower at Mach numbers of 3 and 6, respectively, than those for the straight leading-edge wing.

(c) The curved leading-edge wing with constant spanwise leading-edge radius and wing thickness indicated that approximately one-half of the zero-lift drag-coefficient reduction due to leading-edge curvature with decreasing leading-edge radius and corresponding wing thickness was the result of leading-edge curvature, the remaining reduction being due to decreasing leading-edge radius with corresponding decreasing wing thickness.

(d) Maximum lift-drag ratios, sixteen and thirty-two percent higher than those for the straight leading-edge wing, at Mach numbers of 3 and 6, respectively, were noted for the curved leading-edge wing with decreasing spanwise leading-edge radius and wing thickness.

*Method of introducing curvature to a blunt leading edge which is subjected to aerodynamic heating*

Based on well known theoretical and experimental results, the laminar convective heating rate $dH/dt$ of an aerodynamic leading edge at high-speed flights is a function of leading-edge geometry and is expressed approximately as $$\frac{dH}{dt} \approx \frac{\cos \Lambda}{\sqrt{R}}$$

From this expression, it is noted that by introducing curvature to a leading edge such that its sweep is continuously increased over the leading-edge span, a corresponding reduction in leading-edge radius could be made without altering the geometric relationship on the right-hand side of the equation.

To introduce curvature to a straight leading-edge surface such that the geometric relationship of the leading edge associated with laminar convective heating is not altered, requires that $$\frac{\cos \Lambda}{\sqrt{R}} = \frac{\cos \Lambda'}{\sqrt{R'}} \qquad (1)$$

where the primed values refer to the local geometry of the curved leading edge and the unprimed values refer to the geometry of the straight leading edge.

To include aerodynamic surfaces at angles of attack other than zero, the geometric sweep angle is replaced by the effective sweep angle which is defined by $$\cos \Lambda_e = \sqrt{1-(\cos \alpha \sin \Lambda)^2} \qquad (2)$$

and $$\cos \Lambda'_e = \sqrt{1-(\cos \alpha \sin \Lambda')^2} \qquad (3)$$

Therefore, changing the geometric sweep angle in Equation 1 to the effective sweep angle by using Equations 2 and 3 yields $$\frac{\sqrt{1-(\cos \alpha \sin \Lambda)^2}}{\sqrt{R}} = \frac{\sqrt{1-(\cos \alpha \sin \Lambda')^2}}{\sqrt{R'}} \qquad (4)$$

By using the simplification that the aerodynamic surface is slab-sided and that the curved leading-edge radius $R'$ is equal to the local wing half-thickness $t$ (derivation of the leading-edge radius follows hereinafter), the geometric relationships of FIGS. 5–6 show that $$t = t_r\left(1-\frac{x}{A}\right)$$

Letting the root half-thickness of the slab-sided curved leading-edge surface be equal to the half-thickness of the slab-sided straight leading-edge surface and therefore equal to its leading-edge radius, $t_r = R$, and thus $$R' \approx t = R\left(1-\frac{x}{A}\right)$$

Substituting this expression into Equation 4 for $R'$ yields $$\sqrt{1-(\cos \alpha \sin \Lambda)^2} = \frac{\sqrt{1-(\cos \alpha \sin \Lambda')^2}}{\sqrt{1-\frac{x}{A}}}$$

Solving this equation for $\sin \Lambda'$ and expressing the results in terms of $\tan \Lambda'$, which is the local slope of the curved leading edge, gives $$\tan \Lambda' = -\frac{dy}{dx} = \frac{\sqrt{1-\cos^2 \Lambda_e\left(1-\frac{x}{A}\right)}}{\sqrt{\cos^2 \alpha - 1 + \cos^2 \Lambda_e\left(1-\frac{x}{A}\right)}} \qquad (5)$$

Integration of Equation 5 gives $$y = \sqrt{\frac{A}{\cos^2 \Lambda_e} - A + x} \sqrt{\frac{A \cos^2 \alpha}{\cos^2 \Lambda_e} - \frac{A}{\cos^2 \Lambda_e} + A - x}$$
$$+ \frac{A \cos^2 \alpha}{\cos^2 \Lambda_e} \sin^{-1} \frac{\sqrt{\frac{A \cos^2 \alpha}{\cos^2 \Lambda_e} - \frac{A}{\cos^2 \Lambda_e} + A - x}}{\sqrt{\frac{A \cos^2 \alpha}{\cos^2 \Lambda_e}}} + B \qquad (6)$$

which is the equation of the curved leading edge. The values of the constant $A$ and the constant of integration $B$ are determined by boundary conditions at the tip of the curved leading-edge surface. From Equation 5 the value of $A$ is determined by choosing values of $\Lambda'$ and $x$ at the tip of the curved wing and using known values of the straight leading-edge surface which defines $\Lambda_e$ and $\alpha$. With $A$ determined, the value of $B$ is calculated from Equation 6 by letting $y=0$ when $x$ is the span of the curved leading-edge surface.

To obtain the leading-edge radius, the geometric relations of FIGS. 5 and 6 give $$\frac{D+G}{H-F}=\frac{E}{H} \text{ or } D=E-\frac{EF}{H}-G$$

but $$\frac{G}{R'}=\frac{t_r}{H} \text{ or } G=\frac{R' t_r}{H}$$

so $$D=E-\frac{EF}{H}-\frac{R' t_r}{H}$$

but $$D=C-R'$$

so $$C-R'=E-\frac{EF}{H}-\frac{R' t_r}{H}$$

or $$\frac{EF}{H}-R'+\frac{R' t_r}{H}=E-C$$

where $$F=\frac{ER'}{t_r}$$

therefore $$\frac{E^2 R'}{H t_r}-R'+\frac{R' t_r}{H}=E-C$$

and solving for $R'$ yields $$R'=\frac{C-E}{1-\frac{E^2}{H t_r}-\frac{t_r}{H}}$$

where $$C=\frac{x}{\sin \Lambda'}$$

$$E=\frac{A}{\sin \Lambda'}$$

$$H=\sqrt{t_r^2+E^2}=\sqrt{t_r^2+\frac{A^2}{\sin^2 \Lambda'}}$$

therefore $$R'=\frac{x-A}{\sin \Lambda'-\frac{A^2}{t_r \sqrt{t_r^2 \sin^2 \Lambda'+A^2}}-\frac{t_r \sin \Lambda'}{\sqrt{t_r^2+\frac{A^2}{\sin^2 \Lambda'}}}} \quad (7)$$

From the foregoing description, it is readily apparent that the present invention accomplishes an important advancement in the design of leading-edge surfaces for all flight vehicle components subjected to aerodynamic heating. Accordingly, although the experimental results given herein are related only to the vehicle wing, it is to be understood that the invention is applicable to all leading-edge surfaces such as those illustrated in the exemplary flight vehicle of FIGS. 1–4.

Obviously, many modifications and variations of the present invention are possible in the light of the above teachings. In this respect, the analytical method described herein may also be applied to other than external surfaces of flight vehicles, such for example, on the internal structural members of rocket and jet engines wherein the members are exposed to high-speed flow of a medium that would result in convective heating of the leading edges of the members. It is therefore to be understood that within the scope of the appended claims the invention may be practiced otherwise than as specifically described.

What is claimed as new and desired to be secured by Letters Patent of the United States is:

1. A flight vehicle having superior aerodynamic characteristics at both subsonic and high speed greater than subsonic and being so constructed and arranged as to provide optimum structural efficiency comprising, in combination with said vehicle:

a swept wing for said vehicle, said swept wing being provided with curvature along the leading edge thereof, said wing further being provided with spanwise increasing sweep and spanwise decreasing radius to thereby provide a simple and improved structural wing of spanwise decreasing thickness that minimizes aerodynamic heating of said wing during vehicle flight and wherein said leading edge curvature is computed from the formula $$y=\sqrt{\frac{A}{\cos^2 \Lambda_e}-A+x}\sqrt{\frac{A \cos^2 \alpha}{\cos^2 \Lambda_e}-\frac{A}{\cos^2 \Lambda_e}+A-x}$$

$$+\frac{A \cos^2 \alpha}{\cos^2 \Lambda_e} \sin^{-1} \frac{\sqrt{\frac{A \cos^2 \alpha}{\cos^2 \Lambda_e}-\frac{A}{\cos^2 \Lambda_e}+A-x}}{\sqrt{\frac{A \cos^2 \alpha}{\cos^2 \Lambda_e}}}+B$$

and said leading edge radius is compute from the formula $$R'=\frac{x-A}{\sin \Lambda'-\frac{A^2}{t_r \sqrt{t_r^2 \sin^2 \Lambda'+A^2}}-\frac{t_r \sin \Lambda'}{\sqrt{t_r^2+\frac{A^2}{\sin^2 \Lambda'}}}}$$

where with a chosen leading-edge sweep angle of 79° at the wing tip, a semispan of $x=3.9$, as taken from FIG. 5 of the appended drawings, and an angle of attack of 12°, the value of $A=7.80$ is obtained from the formula $$\tan \Lambda'=-\frac{dy}{dx}=\frac{\sqrt{1-\cos^2 \Lambda_e\left(1-\frac{x}{A}\right)}}{\sqrt{\cos^2 \alpha-1+\cos^2 \Lambda_e\left(1-\frac{x}{A}\right)}}$$

wherein
 $y$=leading edge curvature
 $R'$=leading edge radius
 $A$=constant
 $x$=semispan $$\cos^2 \Lambda_e = 1-\cos \alpha \sin \Lambda)^2$$

$\Lambda$=leading edge sweep angle of the straight leading edge wing that the curved leading edge is designed to replace
$\alpha$=angle of attack
$B$=constant
$\Lambda'$=desired local leading edge sweep at the wing tip, and
$t_r$=desired wing root half-thickness.

2. A novel wing for a supersonic flight vehicle wherein curvature is introduced to a blunt leading edge structural component for said supersonic flight vehicle while maintaining a constant leading edge geometric relationship involved in laminar convective heating rate, and in which the spanwise leading edge sweep and decreasing leading edge radius of said component is increased, said leading edge curvature being computed from the formula $$y=\sqrt{\frac{A}{\cos^2 \Lambda_e}-A+x}\sqrt{\frac{A \cos^2 \alpha}{\cos^2 \Lambda_e}-\frac{A}{\cos^2 \Lambda_e}+A-x}$$

$$+\frac{A \cos^2 \alpha}{\cos^2 \Lambda_e} \sin^{-1} \frac{\sqrt{\frac{A \cos^2 \alpha}{\cos^2 \Lambda_e}-\frac{A}{\cos^2 \Lambda_e}+A-x}}{\sqrt{\frac{A \cos^2 \alpha}{\cos^2 \Lambda_e}}}+B$$

and said leading edge radius being computed from the formula $$R' = \frac{x-A}{\sin \Lambda' - \dfrac{A^2}{t_r \sqrt{t_r^2 \sin^2 \Lambda' + A^2}} - \dfrac{t_r \sin \Lambda'}{\sqrt{t_r^2 + \dfrac{A^2}{\sin^2 \Lambda'}}}}$$

wherein
 $y=$ leading edge curvature
 $x=$ semispan
 $A=$ constant $$\cos^2 \Lambda_e = 1 - (\cos \alpha \sin \Lambda)^2$$

$\Lambda=$ leading edge sweep angle of the straight leading edge wing that the curved leading edge is designed to replace
 $\alpha=$ angle of attack
 $B=$ constant
 $R'=$ leading edge radius
 $t_r=$ desired wing root half-thickness, and
 $\Lambda'=$ desired local leading edge sweep at the wing tip.

3. A high speed flight vehicle having improved flight efficiency at both subsonic and high speeds wherein all leading edges of said vehicle are provided with leading edge curvature while maintaining leading edge sweep and a corresponding decreasing leading edge radius such that the relationship between sweep and radius that is normally associated with aerodynamic heating at high speeds is not altered wherein said leading edge curvature is computed from the formula:

$$y = \sqrt{\frac{A}{\cos^2 \Lambda_e} - A + x} \sqrt{\frac{A \cos^2 \alpha}{\cos^2 \Lambda_e} - \frac{A}{\cos^2 \Lambda_e} + A - x}$$
$$+ \frac{A \cos^2 \alpha}{\cos^2 \Lambda_e} \sin^{-1} \frac{\sqrt{\dfrac{A \cos^2 \alpha}{\cos^2 \Lambda_e} - \dfrac{A}{\cos^2 \Lambda_e} + A - x}}{\sqrt{\dfrac{A \cos^2 \alpha}{\cos^2 \Lambda_e}}} + B$$

with
 $y=$ leading edge curvature
 $x=$ semispan
 $A=$ constant $$\cos^2 \Lambda_e = 1 - (\cos \alpha \sin \Lambda)^2$$

$\Lambda=$ leading edge sweep angle of the straight leading edge wing that the curved leading edge is designed to replace
 $\alpha=$ angle of attack and
 $B=$ constant.

4. The flight vehicle of claim 3 wherein said leading edge radius is computed from the formula:

$$R' = \frac{x-A}{\sin \Lambda' - \dfrac{A^2}{t_r \sqrt{t_r^2 \sin^2 \Lambda' + A^2}} - \dfrac{t_r \sin \Lambda'}{\sqrt{t_r^2 + \dfrac{A^2}{\sin^2 \Lambda'}}}}$$

where
 $R'=$ leading edge radius
 $x=$ semispan
 $A=$ constant
 $\Lambda'=$ desired local leading edge sweep at the wing tip, and
 $t_r=$ desired wing root half-thickness.

References Cited
UNITED STATES PATENTS

| | | | |
|---|---|---|---|
| 1,117,556 | 11/1914 | Denine | 244—35 |
| 2,257,260 | 9/1941 | Kartveli | 244—35 |
| 2,316,885 | 4/1943 | Ortega | 244—13 |
| 3,032,298 | 5/1962 | Callahan | 244—119 |
| 3,134,561 | 5/1964 | Clejan | 244—58 |

FOREIGN PATENTS 45,933  12/1928  Norway.

MILTON BUCHLER, *Primary Examiner.*

T. W. BUCKMAN, *Assistant Examiner.*